US 6,617,825 B2

(12) United States Patent
Chu (10) Patent No.: US 6,617,825 B2
(45) Date of Patent: Sep. 9, 2003

(54) ELECTRONIC DEVICE WITH A POWER GENERATOR (75) Inventor: Shao-Kang Chu, Taipei Hsien (TW)

(73) Assignee: Aopen Inc., Hsi-Chih (TW)

( * ) Notice: Subject to any disclaimer, the term of this patent is extended or adjusted under 35 U.S.C. 154(b) by 0 days.

(21) Appl. No.: 09/683,961

(22) Filed: Mar. 6, 2002

(65) Prior Publication Data
US 2003/0048092 A1 Mar. 13, 2003

(30) Foreign Application Priority Data
Sep. 12, 2001 (TW) .................................. 90122677 A (51) Int. Cl.$^7$ .............................................. H01M 10/46
(52) U.S. Cl. ...................................................... 320/114
(58) Field of Search ................................. 320/102, 107, 320/114, 115, DIG. 28, DIG. 35, DIG. 36; 290/14, 16, 50; 310/40 R (56) References Cited

U.S. PATENT DOCUMENTS

| 4,245,640 A | * | 1/1981 | Hunt |
| 5,549,172 A | * | 8/1996 | Mutoh et al. |
| 6,057,668 A | * | 5/2000 | Chao |
| 6,414,400 B1 | * | 7/2002 | Scott et al. |

* cited by examiner

Primary Examiner—Edward H. Tso
(74) Attorney, Agent, or Firm—Winston Hsu (57) ABSTRACT An electronic device with a power generator has a rotational component, a power generator, a commutator, a battery charger, and a transmission component. The commutator is electrically coupled with the power generator. The battery charger is electrically coupled with the commutator for providing a charging power source. The transmission component is coupled between the rotational component and a shaft. When the rotational component rotates, the rotational component drives the transmission component so as to make the shaft rotate and make a coil generate an induced current. The induced current is transmitted into the commutator. An output of the commutator is used to charge the battery charger.

13 Claims, 8 Drawing Sheets

ELECTRONIC DEVICE WITH A POWER GENERATOR

BACKGROUND OF INVENTION

1. Field of the Invention

The present invention relates to an electronic device, and more particularly, to an electronic device with a power generator.

2. Description of the Prior Art

In general electronic devices, such as portable or mobile electronic devices, how to save power sources and well use the energy is currently undergoing a high amount of research. In the present industry, there are methods for saving energy such as improving the manufacture processes of integrated circuits, reducing working voltage of electronic components, using high-efficiency power source systems, and using advanced power source management, etc.

In order to save the energy, when an electronic device is working or standby, even though it may be a small current such as milliamperes or microamperes of current, the current must be well managed and applied. However, if new power sources can be created while the electronic device is working, it may increase the usable time of the electronic device.

A mouse will be used as an example. A rolling wheel is an operation input component of the mouse. If mechanical energy generated when the rolling wheel is rotating can be converted into electrical energy and the converted electrical energy saved, the converted electrical energy can be used to drive the mouse. Therefore, it can save the power provided to the mouse from the external power source. Mobile phones are another good example. A jogging dial is an operation input component of the mobile phone. If mechanical energy generated when the jogging dial is rotated can be converted into electrical energy and the converted electrical energy saved, the converted electrical energy can be used to drive the mobile phone. Therefore, it can lengthen the usable time of the mobile phone. Consequently, the purpose of the present invention is to teach that how to convert the mechanical energy into electrical energy.

SUMMARY OF INVENTION

It is therefore a primary objective of the claimed invention to provide an electronic device with a power generator. The electronic device comprises a rotational component which is an operation input component of the electronic device. The rotational component can generate mechanical energy when it is rotated. The power generator of the electronic device is used to convert the mechanical energy of the rotational component into electrical energy to be saved. So that the present invention can achieve the purpose of reducing power provided to the electronic device from the external power source and increasing the usable time of the electronic device.

The claimed invention, briefly summarized, discloses an electronic device with a power generator. The electronic device comprises a rotational component, a power generator, a commutator, a battery charger, and a transmission component. The rotational component is an operation input component of the electronic device. The power generator comprises a shaft, a coil, a first magnet, and a second magnet. The coil is circled about the shaft by using the shaft as an axle center. The first magnet and the second magnet are disposed on two sides of the shaft. The magnets are disposed in a manner that a pole of the first magnet faces an opposite pole of the second magnet. The commutator is electrically coupled with the power generator. The battery charger is electrically coupled with the commutator for providing a charging power source. The transmission component is coupled between the rotational component and the shaft. When the rotational component rotates, the rotational component drives the transmission component so as to make the shaft rotate and make the coil generate an induced current. The induced current is transmitted into the commutator. An output of the commutator is used to charge the battery charger.

It is an advantage of the claimed invention that the present invention electronic device comprises a power generator. The power generator can generate a charging power source. Therefore, the present invention electronic device can reduce the power provided to the electronic device from the external power source or the backup power supply, and increase the using time of the electronic device.

These and other objectives of the present invention will no doubt become obvious to those of ordinary skill in the art after reading the following detailed description of the preferred embodiment which is illustrated in the various figures and drawings.

DETAILED DESCRIPTION

A characteristic of the present invention is that a power generator is installed in the electronic device. The electronic device comprises a rotational component which is an operation input component of the electronic device. The rotational component can generate mechanical energy when it is rotated. The power generator of the electronic device is used to convert the mechanical energy of the rotational component into electrical energy to be saved. The power generator uses the principle that if the coil rotates in magnetic field, then an induced current will be generated. The rotation of the coil is driven by the rotational component. Therefore, the present invention can achieve the purpose of reducing the power provided to the electronic device from the external power source, and increasing the usable time of the electronic device.

Figure 1:
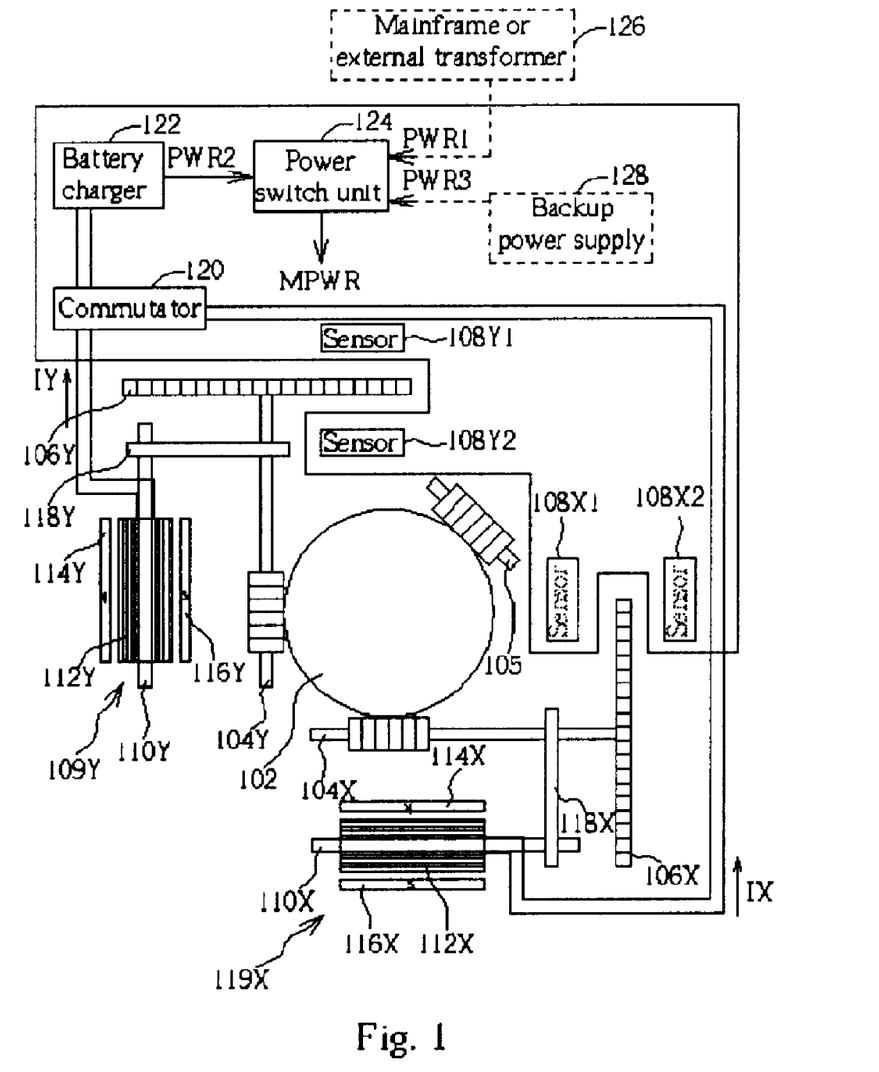
FIG. 1 is a perspective view of a mouse with a power generator according to the present invention.

Using mouse as an example, the rolling wheel is a rotational component of the mouse. Please refer to FIG. 1. FIG. 1 is a perspective view of the mouse with a power generator according to the present invention. A rolling wheel 102 disposed inside a cavity of the mouse is an operation input component of the mouse. When users move the mouse, the rolling wheel 102 rotates and drives the shafts 104x and 104y contacted with the rolling wheel 102 to rotate. Gears 106x and 106y are installed on one end of shafts 104x and 104y. The gears 106x and 106y respectively comprise a plurality of slots. Sensors 108x1, 108x2 and 108y1, 108y2 are installed on two sides of gears 106x and 106y. When the shafts 104x and 104y rotate, the shafts 104x and 104y will drive the gears 106x and 106y to rotate, and then the sensors 108x1, 108x2, 108y1 and 108y2 will measure the rotation of the shaft 104x and 104y so that the mouse will generate movement signals corresponding to the rotation of the rolling wheel 102. An auxiliary shaft 105 is used to assist the rotation of the rolling wheel 102.

The power generators 109x and 109y of the present invention electronic device comprise shafts 110x and 110y, coils 112x and 112y, magnets 114x and 114y, and magnets 116x and 116y. The coils 112x and 112y are circled about the shafts 110x and 110y by using the shafts 110x and 110y as axle centers. The magnets 114x and 114y and magnets 116x and 116y are disposed on two sides of the shafts 110x and 110y. The magnets 114x, 114y and 116x, 116y are disposed in a manner that poles of the magnets 114x and 114y face opposite poles of the magnets 116x and 116y. For example, N poles of the magnets 114x and 114y face S poles of the magnets 116x and 116y. The shafts 104x and 104y are respectively connected with the shafts 110x and 110y through transmission components 118x and 118y.

The outputs of the power generators 109x and 109y are transmitted into a commutator 120. The commutator 120 is used to convert the alternating signals that are outputted from the power generator 109x and 109y into direct signals, and transmit the converted direct signals into a battery charger 122. Therefore, the power generated by the power generator 109x and 109y can be saved. The battery charger 122 can provide a charging power source PWR2.

The transmission components 118x and 118y are coupled with the shafts 110x and 110y, and coupled with the rolling wheel 102 through the shafts 104x and 104y. When the rolling wheel 102 rotates, the rolling wheel 102 will drive the shafts 104x and 104y to rotate, and then the shafts 104x and 104y drive the shafts 110x and 110y rotate through the transmission components 118x and 118y. When the shafts 110x and 110y rotate, the coils 112x and 112y circled about the shafts 110x and 110y will rotate in the magnetic fields formed by the magnets 114x, 116x and magnets 114y, 116y. Based on Faraday"s electromagnetic induction law, only if there is relative motion between coils 112x, 112y and magnets 114x, 116x and 114y, 116y, and the relative motion changes a magnetic flux passing through the coils 112x and 112y, then induced currents IX and IY are generated inside the coils 112x and 112y due to induction of electromotive forces. The induced currents IX and IY are transmitted into the commutator 120, and an output of the commutator 120 is used to charge the battery charger 122.

The transmission component 118x and 118y can be a belt or a gear set. There is not any limit about shapes of the coils 112x, 112y and magnets 114x, 116x, 114y and 116y. As long as the magnetic flux passing through the coils 112x and 112y can change when the coils 112x and 112y rotate, it is included in the present invention.

Figure 2:
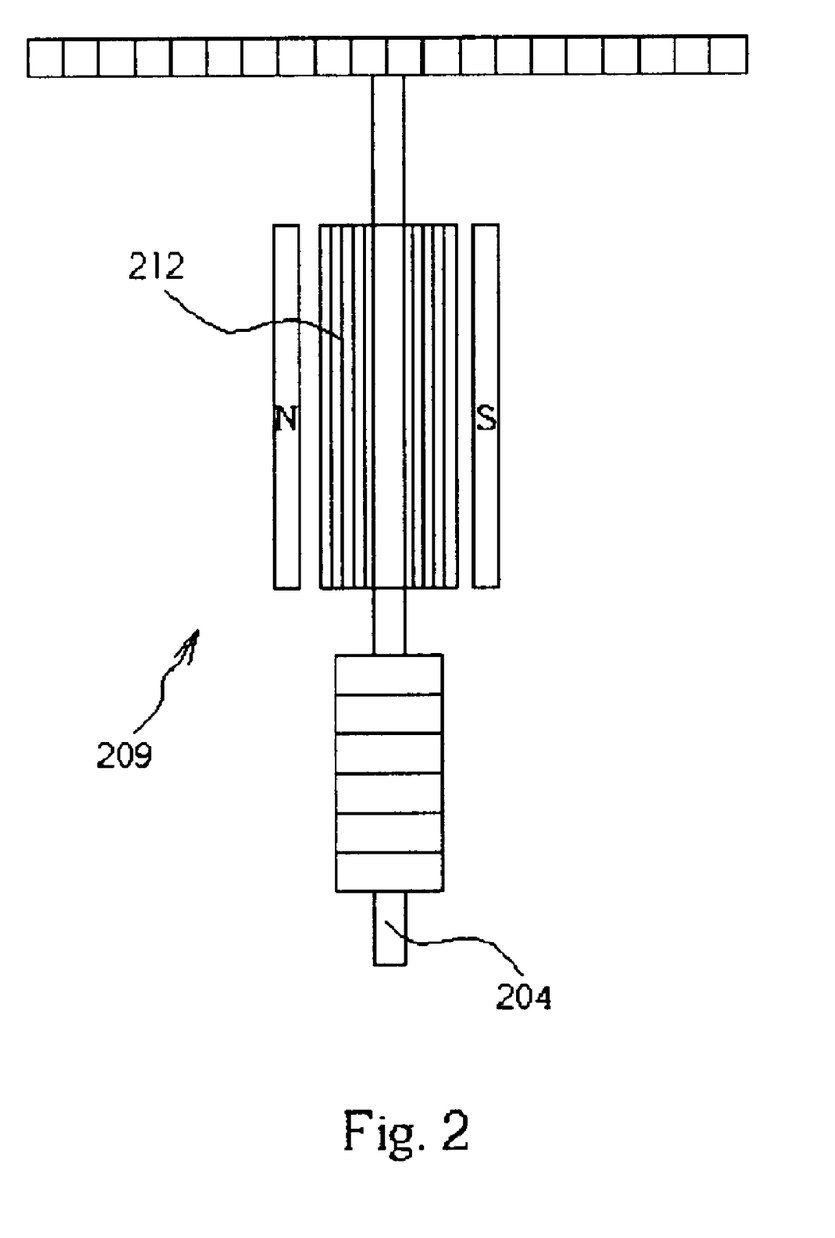
FIG. 2 is a perspective view of a shaft and a power generator of a mouse according to another embodiment of the present invention.

FIG. 1 is an example that uses shafts 104x and 104y to drive the power generators 109x and 109y through the transmission components 118x and 118y. However, the present invention can also not use the transmission components 118x and 118y, but only use the shafts 104x and 104y to rotate the coils 112x and 112y of the power generators 109x and 109y directly. Please refer to FIG. 2. FIG. 2 is a perspective view of a shaft and a power generator of a mouse according to another embodiment of the present invention. A coil 212 of a power generator 209 is circled about the shaft 204, and the shaft 204 is contacted with the rolling wheel (not shown in FIG. 2) directly. When the rolling wheel rotates, the rolling wheel rotates the shaft 204 so as to cause the coil 212 to generate an induced current. The induced current is transmitted into a commutator, and an output of the commutator is used to charge a battery charger.

Please refer to FIG. 1. Power sources of the electronic device of the present invention can not only be the charging power source PWR2 provided by the battery charger 122, but can also be a external power source PWR1 provided by an external host or an external transformer 126, or a backup power source PWR3 provided by the backup power supply 128 which is installed inside the electronic device. A power switch unit 124 is installed inside the electronic device for selecting the external power source PWR1, charging power source PWR2, or the backup power source PWR3 to be a main power source MPWR of the electronic device. The power switch unit 124 is electrically connected to the battery charger 122, the host or the external transformer 126, or the backup power supply 128.

Please refer to FIG. 3A to FIG. 3D. FIG. 3A to FIG. 3D are inner circuit diagrams of four types of the power switch unit shown in FIG. 1. Please refer to FIG. 3A. The first type of the power switch unit 124 comprises a switch 302. The switch 302 is only electrically connected to the battery charger 122 and the host or the external transformer 126. The switch 302 is used to select the external power source PWR1 or the charging power source PWR2 to be the main power source MPWR of the electronic device.

Figure 3A:
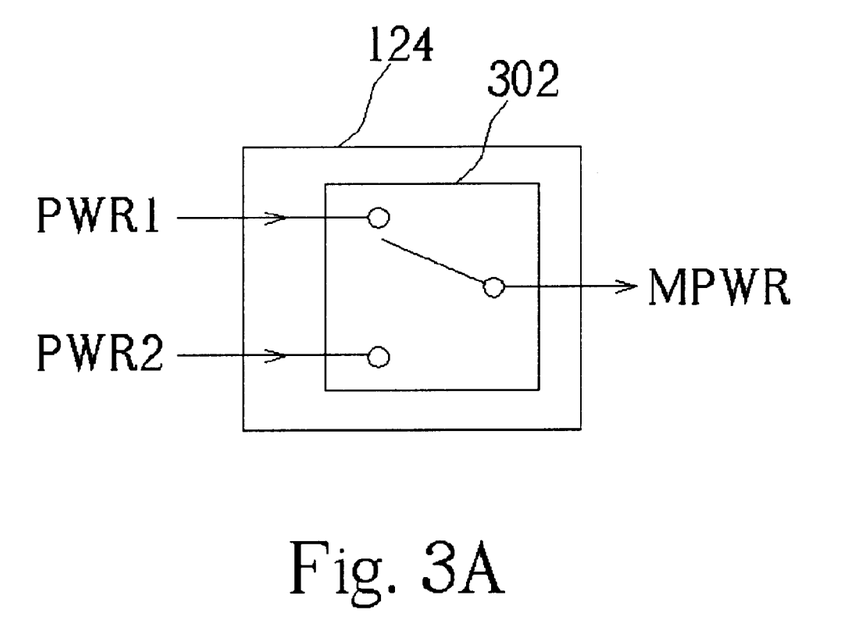
FIG. 3A to FIG. 3D are inner circuit diagrams of four types of the power switch unit shown in FIG. 1.
Figure 3B:
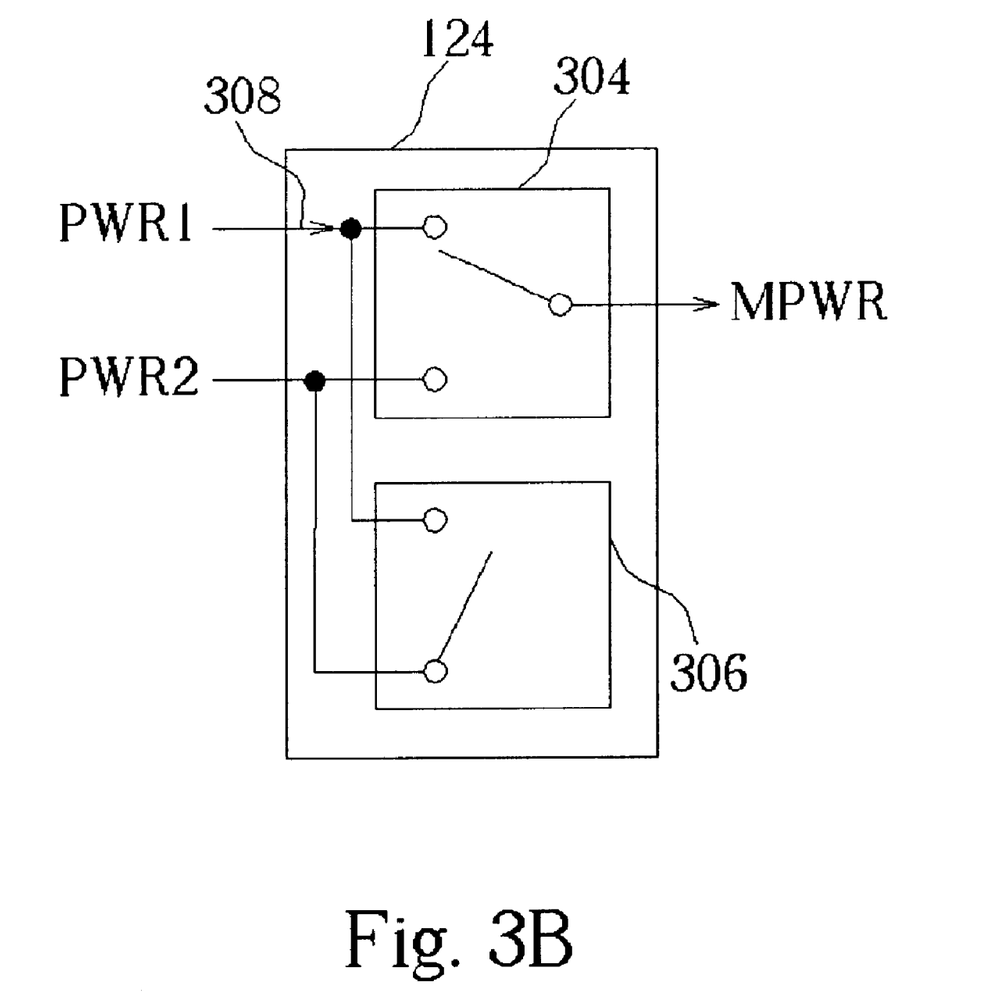

Please refer to FIG. 3B. The second type of the power switch unit 124 comprises two switches 304 and 306. The switches 304 and 306 are electrically connected to the battery charger 122 and the host. The switch 304 is used to select the external power source PWR1 or the charging power source PWR2 to be the main power source MPWR of the electronic device. A power cord 308 is electrically connected between the battery charger 122 and the host. When the switch 306 is turned on, the charging power source PWR2 inside the battery charger 122 is charged back to the host.

Figure 3C:
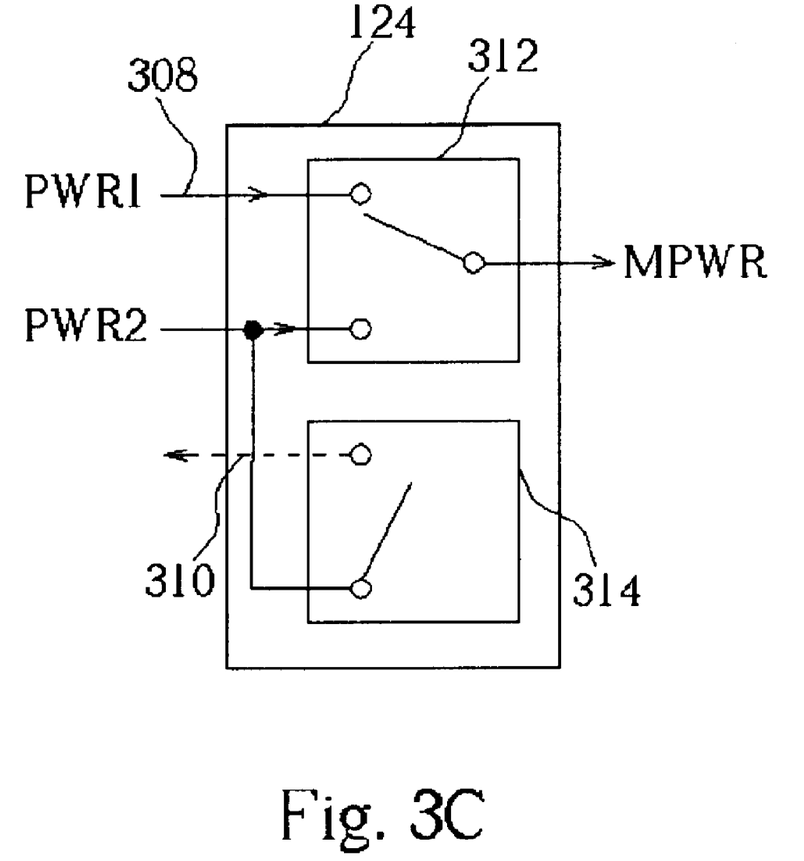

Please refer to FIG. 3C. The third type of the power switch unit 124 comprises two switches 312 and 314. The switches 312 and 314 are electrically connected to the battery charger 122. The switch 312 is electrically connected to the host through the power cord 308. The switch 314 is electrically connected to the host through an additional power cord 310. The switch 312 is used to select the external power source PWR1 or the charging power source PWR2 to be the main power source MPWR of the electronic device. When the switch 314 is turned on, the charging power source PWR2 inside the battery charger 122 can charge back to the host through the power cord 310.

Figure 3D:
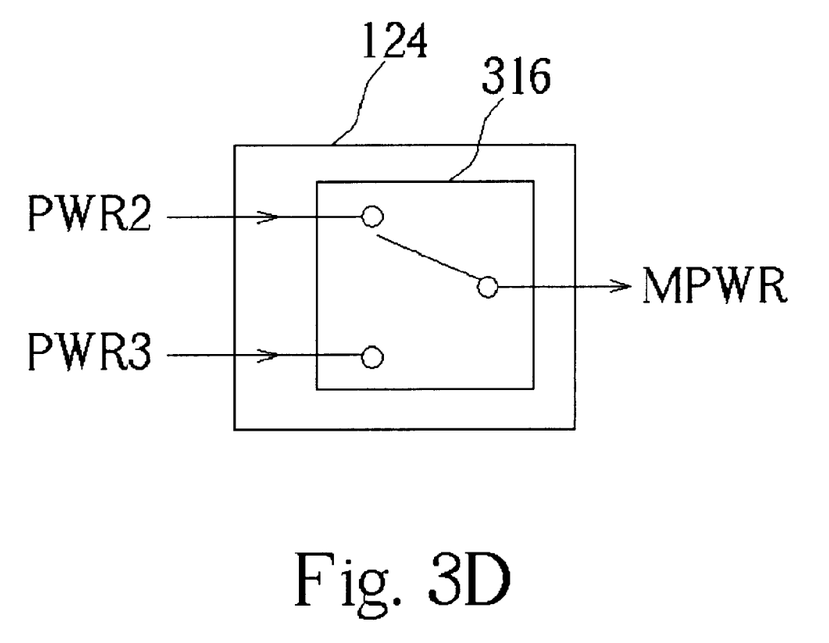

Please refer to FIG. 3D. The fourth type of the power switch unit 124 comprises a switch 316. The switch 316 is electrically connected to the battery charger 122 and the backup power supply 128. The switch 316 is used to select the backup power source PWR3 or the charging power source PWR2 to be the main power source MPWR of the electronic device.

FIG. 1 uses the mouse as an example of the present invention; however, the present invention is not limited to just a mouse. The rotational component of the present invention can also be a jogging dial. The jogging dial is disposed on a side of the electronic device for being an operation input component of the electronic device. Users can rotate the jogging dial so as to operate the electronic device of the present invention. The jogging dial is connected to the transmission component so as to rotate the coil inside the power generator.

Figure 4A:
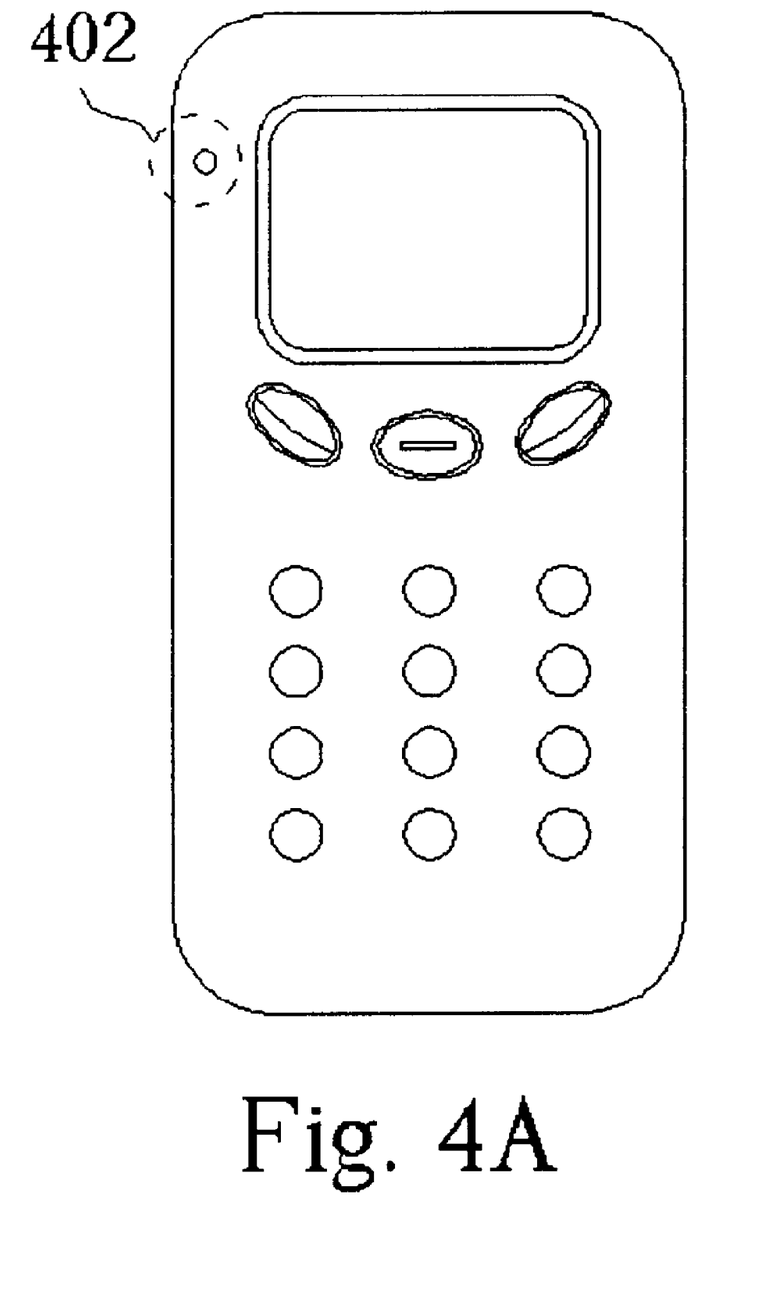
FIG. 4A is a perspective view of a mobile phone with a power generator according to the present invention.
Figure 4B:
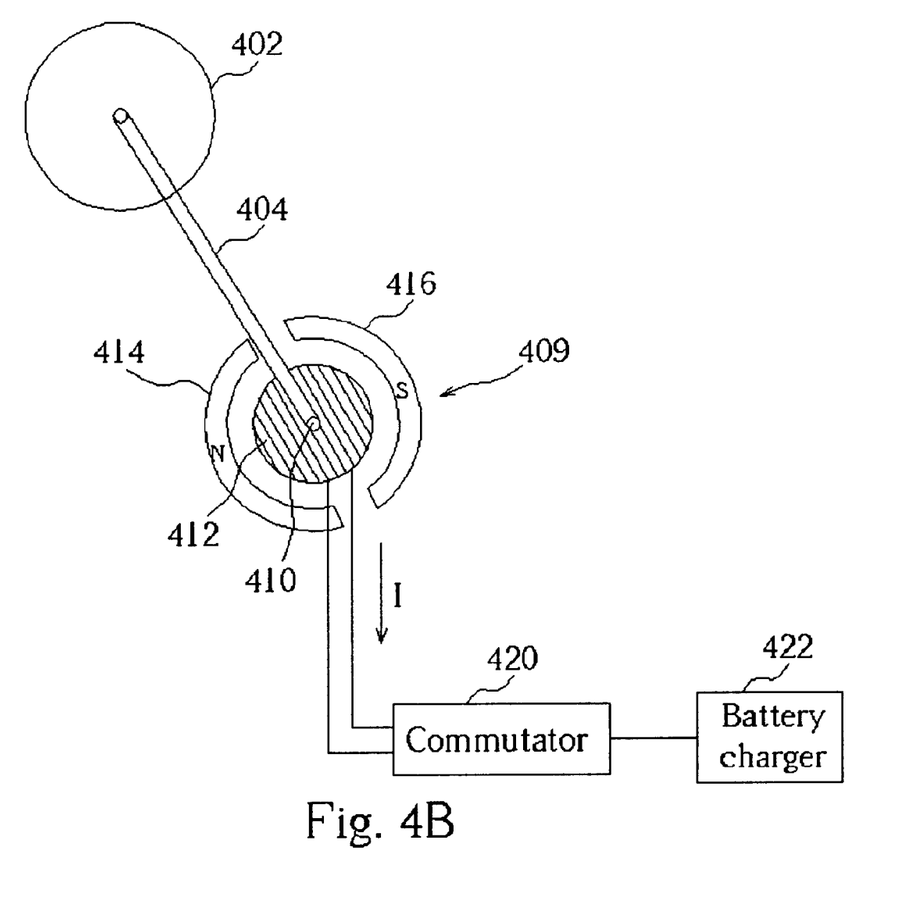
FIG. 4B is a related diagram between the jogging dial and the power generator of the mobile phone shown in FIG. 4A.

The following uses a mobile phone with a jogging dial as an example of the present invention. Please refer to FIG. 4A and FIG. 4B. FIG. 4A is a perspective view of the mobile phone with a power generator according to the present invention. FIG. 4B is a related diagram between the jogging dial and the power generator of the mobile phone shown in FIG. 4A. The jogging dial 402 is coupled with the power generator 409 through the transmission component. The transmission component can be a belt 404. The power generator 409 comprises a shaft 410, a coil 412, and two magnets 414 and 416. The coil 412 is circled about the shaft 410 by using the shaft 410 as an axle center. The magnets 414 and 416 are disposed on two sides of the shaft 410. The magnet 414 and magnet 416 are disposed in a manner such that a pole of the magnet 414 faces an opposite pole of the magnet 416. The mobile phone further comprises a commutator 420 and a battery charger 422. The commutator 420 is electrically coupled with the power generator 409. The battery charger 422 is electrically coupled with the commutator 420. The belt 404 is coupled between the jogging dial 402 and the shaft 410. When the jogging dial 402 rotates, the jogging dial 402 rotates the shaft 410 through the belt 404 so as to cause the coil 412 to generate an induced current I. The induced current I is transmitted into the commutator 420, and an output of the commutator 420 is used to charge the battery charger 422.

The battery charger 422 can electrically connect to the power switch unit (not shown in FIG. 4B). The power switch unit can select an external power source or a charging power source outputted from the battery charger to be a main power source of the electronic device, or the power switch unit can select a backup power source or the charging power source to be the main power source of the electronic device.

In contrast to the prior art electronic device, the present invention electronic device comprises a power generator. The power generator can generate a charging power source. Therefore, the present invention electronic device can achieve the purpose of reducing the power provided to the electronic device from the external power source or the backup power supply, and increasing the usable time of the electronic device.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An electronic device with a power generator, the electronic device comprising:
    a rotational component being an operation input component of the electronic device;
    a power generator comprising:
        a first shaft;
        a coil circled about the first shaft by using the first shaft as an axle center; and
        a first magnet and a second magnet disposed on two sides of the first shaft, the magnets being disposed in a manner that a pole of the first magnet faces an opposite pole of the second magnet;
    a commutator electrically coupled with the power generator;
    a battery charger electrically coupled with the commutator for providing a charging power source; and
    a transmission component coupled between the rotational component and the first shaft;
    wherein when the rotational component rotates, the rotational component drives the transmission component so as to make the first shaft rotate and make the coil generate an induced current, the induced current transmitting into the commutator, an output of the commutator being used to charge the battery charger.

2. The electronic device of claim 1 wherein the electronic device is a mouse, and the rotational component is a rolling wheel, the rolling wheel being connected to the transmission component through a second shaft, the rolling wheel being capable of driving the second shaft to rotate so that the mouse generates signals corresponding to a movement of the mouse.

3. The electronic device of claim 1 wherein the electronic device receives an external power source transmitted from a host, and the electronic device further comprises a power switch unit for selecting the external power source or the charging power source to be a main power source of the electronic device.

4. The electronic device of claim 3 wherein the power switch unit comprises a first switch and a second switch respectively electrically connected to the battery charger and the host, the first switch is used to select the external power source or the charging power source to be the main power source of the electronic device, and when the second switch is turned on, the charging power source is capable of charging the host.

5. The electronic device of claim 1 wherein the electronic device receives an external power source transmitted from an external transformer, and the electronic device further comprises a power switch unit for selecting the external power source or the charging power source to be a main power source of the electronic device.

6. The electronic device of claim 1 wherein the electronic device further comprises a backup power source and a power switch unit, the battery charger providing the charging power source, the power switch unit being used to select the backup power source or the charging power source to be a main power source of the electronic device.

7. The electronic device of claim 1 wherein the transmission component is a belt.

8. The electronic device of claim 1 wherein the transmission component is a gear set.

9. The electronic device of claim 1 wherein the rotational component is a jogging dial connected to the transmission component.

10. The electronic device of claim 9 being a mobile phone.

11. A mouse with a power generator, the mouse comprising:
    a rolling wheel being an operation input component of the mouse;
    a power generator comprising:
        a shaft coupled with the rolling wheel;
        a coil circled about the shaft by using the shaft as an axle center; and
        a first magnet and a second magnet disposed on two sides of the shaft, the magnets being disposed in a manner that a pole of the first magnet faces an opposite pole of the second magnet;
    a commutator electrically coupled with the power generator; and a battery charger electrically coupled with the commutator;

wherein when the rolling wheel rotates, the rolling wheel rotates the shaft so as to make the coil generate an induced current, the induced current transmitting into the commutator, the output of the commutator being used to charge the battery charger.

12. The mouse of claim 11 wherein the mouse receives an external power source, and the mouse further comprises a power switch unit for selecting the external power source or a charging power source provided by the battery charger to be a main power source of the mouse.

13. The mouse of claim 11 further comprising a backup power source and a power switch unit, the battery charger providing a charging power source, the power switch unit being used to select the backup power source or the charging power source to be a main power source of the mouse.

* * * * *